United States Patent [19]

Yen et al.

[11] 3,902,928

[45] Sept. 2, 1975

[54] METAL JOINING FLUX

[75] Inventors: Chia-Wing Yen, Plymouth; Duane J. Schmatz, Dearborn Heights, both of Mich.

[73] Assignee: Ford Motor Company, Dearborn, Mich.

[22] Filed: June 24, 1974

[21] Appl. No.: 482,721

Related U.S. Application Data

[63] Continuation of Ser. No. 302,178, Oct. 30, 1972.

[52] U.S. Cl. ................................................. 148/23
[51] Int. Cl.² ......................................... B23K 35/34
[58] Field of Search ................................ 148/23–26

[56] References Cited

UNITED STATES PATENTS

| 2,657,458 | 11/1953 | Pessel | 148/26 |
| 2,706,161 | 4/1955 | Westby | 148/26 |
| 2,817,893 | 12/1957 | Cunningham | 148/26 |
| 2,817,894 | 12/1957 | Steinberg | 148/26 |
| 2,817,895 | 12/1957 | Chill | 148/26 |

*Primary Examiner*—Peter D. Rosenberg
*Attorney, Agent, or Firm*—William E. Johnson; Keith L. Zerschling

[57] ABSTRACT

A metal joining flux is disclosed in which the active fluxing ingredients are cupric chloride and zinc chloride. No ammonium chloride is utilized in the flux.

2 Claims, No Drawings

METAL JOINING FLUX

This is a continuation of application Ser. No. 302,178, filed Oct. 30, 1972.

BACKGROUND OF THE INVENTION

A successful metal joining operation depends to a large degree on the performance of the flux use therein. For effective and rapid fluxing action, reaction type fluxes are preferred. Reaction type fluxes consist of heavy-metal chlorides, usually of zinc or tin, combined with ammonium chloride. The heavy-metal chlorides are the primary fluxing agents in such fluxes. Ammonium chloride is added to improve the fluidity and the wetting characteristics of the flux and, also, to provide a protective film that prevents reoxidation of cleaned metal surfaces which are to be joined. Sometimes small amounts of compounds such as hydrochloric acid, sodium fluoride and wetting agents are added to adjust particular characteristics of the flux. The prior art has recognized that among the reaction fluxes, the zinc chloride-ammonium chloride combination is the best.

In most areas, pollution regulations require the recovery of metallic elements, such as zinc, from the flux waste and flux waste wash water. The presence of ammonium ions, from the ammonium chloride, in the flux waste and the waste water makes the recovery of metallic elements difficult since the ammonium ion has a strong tendency to form ammonia complexes with various metallic elements, especially zinc. Once a metal/ammonia complex forms, it is difficult to separate and to recover the metallic elements. It is, therefore, desirable to replace the ammonium chloride utilized in reaction type fluxes to eliminate this problem.

SUMMARY OF THE INVENTION

This invention relates to a metal joining flux, and more particularly, to a metal joining flux which does not contain any ammonium chloride.

It has been found that the addition of cupric chloride to a zinc chloride base flux will provide a flux having excellent wetting characteristics and will provide a flux which forms a very strong protecting film on fluxed articles. No ammonium chloride is contained in the flux. This new flux eliminates the formation of metal-ammonia complexes in flux waste and flux wash water, which complexes are undesirable from the standpoint of pollution control.

DESCRIPTION OF THE PREFERRED EMBODIMENT

The metal joining flux of this invention employs cupric chloride and zinc chloride as the active fluxing agents. The flux does not contain any ammonium chloride. Data obtained from solder spreading tests using a number of solders with both brass and copper substrates indicates the beneficial effect of cupric chloride in a flux begins to have a significant effect at about 7% by weight of this active fluxing ingredient. The balance of the active fluxing ingredients in the metal joining flux is zinc chloride. The effect of cupric chloride is optimized at around 20% by weight but up to 40% by weight of the active fluxing agents may be cupric chloride, if desired.

A small addition of hydrochloric acid can be made to increase the cleaning power of the flux. Wetting agents such as Tergitol may be added to the active fluxing agents in order to increase the flowability and wetability of the flux. Tin chloride can also be added to the active fluxing agents for the purpose of improving the wetting characteristics of the flux.

EXAMPLE

An example of a new zinc chloride-cupric chloride base flux which presents an excellent fluxing action is as follows: zinc chloride 78.5% by weight, hydrous staneous chloride 1.5% by weight, and cupric chloride 20% by weight of solid material present are mixed together. Three hundred fifty grams of the solid material are dissolved in one liter of water. To this is added 1 cc of Tergitol as a wetting agent and 5 cc of hydrochloric acid.

The flux vehicle can be water or any other solvent which can dissolve the solid flux and wet the metal surface to be fluxed in a proper fashion. The amount of hydrochloric acid, wetting agent, and tin chloride in the flux can be adjusted depending on the particular job to be accomplished by the flux. Other known materials for adjusting specific properties of the flux can be added if desired.

The protective film formed by the metal joining flux of this invention which uses cupric chloride and zinc chloride as the active fluxing agents is so strong that the molten solder will continue to flow and wet the flux covered metal surface even after the joined components are removed from a soldering furnace. This type of after-flow/wetting is rarely seen in fluxes containing ammonium chloride. Such ammonium chloride containing flux film deteriorate more readily when heated.

Having disclosed our invention, we claim the following:

1. A metal joining flux in which the fluxing ingredients consist essentially of 7 to 40% by weight cupric chloride and 93 to 60% by weight of zinc chloride, said fluxing ingredients being carried in a flux vehicle, said metal joining flux being further characterized by containing no ammonium chloride as an ingredient thereof.

2. The metal joining flux of claim 1 wherein said cupric chloride is present in the amount of about 20% by weight.

* * * * *

UNITED STATES PATENT OFFICE
CERTIFICATE OF CORRECTION

Patent No. 3,902,928             Dated September 2, 1975

Inventor(s) Chia-Ming Yen and Duane J. Schmatz

It is certified that error appears in the above-identified patent and that said Letters Patent are hereby corrected as shown below:

Inventor "Chia-Wing Yen" should be

-- Chia-Ming Yen --.

Signed and Sealed this

Nineteenth Day of October 1976

[SEAL]

Attest:

RUTH C. MASON
*Attesting Officer*

C. MARSHALL DANN
*Commissioner of Patents and Trademarks*